United States Patent
Lee

[19]

[11] Patent Number: 5,838,190

[45] Date of Patent: Nov. 17, 1998

[54] NEGATIVE VOLTAGE DRIVE CIRCUIT

[75] Inventor: Jong Sang Lee, Ichon, Rep. of Korea

[73] Assignee: Hyundai Electronics Industries, Co., Ltd., Kyungki-Do, Rep. of Korea

[21] Appl. No.: 731,419

[22] Filed: Oct. 15, 1996

[30] Foreign Application Priority Data

Oct. 14, 1995 [KR] Rep. of Korea ................. 1995 35435

[51] Int. Cl.⁶ ....................................................... G05F 3/02
[52] U.S. Cl. .......................... 327/537; 327/536; 327/534; 327/535; 327/537; 307/110
[58] Field of Search ..................... 327/534, 535, 327/536, 537; 307/110

[56] References Cited

U.S. PATENT DOCUMENTS

| 5,126,590 | 6/1992 | Chern | 327/536 |
|---|---|---|---|
| 5,266,842 | 11/1993 | Park | 327/534 |
| 5,319,604 | 6/1994 | Imondi et al. | 365/230.06 |
| 5,343,088 | 8/1994 | Jeon | 327/536 |
| 5,347,171 | 9/1994 | Cordoba et al. | 327/536 |
| 5,367,489 | 11/1994 | Park et al. | 327/534 |
| 5,412,257 | 5/1995 | Cordoba et al. | 327/536 |
| 5,436,587 | 7/1995 | Cernea | 327/536 |

*Primary Examiner*—Terry Cunningham
*Attorney, Agent, or Firm*—Scott C. Harris, Esq.

[57] ABSTRACT

A negative voltage drive circuit according to the present invention comprises a switching means coupled between an input terminal and an output terminal; a cross latch pumping means for controlling the switching means in response to first and second clock signals and for maintaining the lower output voltage than that of said charge pump; and a capacitor which starts pumping operation according to the first clock signal when the output terminal is isolated to the input terminal.

10 Claims, 6 Drawing Sheets

5,838,190

NEGATIVE VOLTAGE DRIVE CIRCUIT

FIELD OF INVENTION

This invention relates to a negative voltage drive circuit, and more particularly to a negative voltage drive circuit for supplying a negative voltage to a gate electrode of flash EEPROM cell.

BACKGROUND OF INVENTION

Generally, a negative voltage is supplied to gate electrode of a flash EEPROM cell to erase a data stored in the flash EEPROM cell. In order to supply such a negative voltage, a charge pump 1 generating a negative voltage in response to first and second clock signals, a regulator 2 to regulate the negative voltage, a pass transistor T for supplying the negative voltage to a gate electrode G of the flash EEPROM cell and a negative voltage drive circuit 3 to control the pass transistor T according to the first and second clock signals are required, as shown in FIG. 1. The negative voltage drive circuit of FIG. 1 will be explained with reference to FIG. 2 and FIG. 6.

Referring to FIG. 2, the first clock signal CK1 of FIG. 6 is applied to a pumping capacitor M3 while the second clock signal of FIG. 2 is applied to a pumping capacitor M4. The phase difference between the first clock signal CK1 and the second clock signal CK2 is 180 degrees, as shown in FIG. 6.

Transistors M1 and M2 are alternately turned on in response to the first and second clock signals CK1 and CK2 passing through the pumping capacitors M3 and M4, respectively, whereby the negative voltage inputted to an input terminal In is transmitted to an output terminal out to which a load capacitor C2 is coupled. However, a voltage which is coupled by the pumping capacitors M3 and M4 is varied since the pumping capacitor M4 is directly coupled to the output terminal out. In addition, a threshold voltage of the PMOS transistors M1 and M2 is increased since the PMOS transistors M1 and M2 are affected by the body effect. Furthermore, when such a threshold voltage is higher than the coupling voltage, which is generated by the coupling ratio of the pumping capacitors M3 and M4, and the load capacitor C2, the PMOS transistors M1 and M2 are not turned on and the output voltage of the charge pump is not transmitted to the output terminal out, whereby the output of the negative voltage drive circuit becomes saturated. Also, if the capacitance of the load capacitor C2 is larger than that of the pumping capacitors M3 and M4, and the r-effect of the pass transistors M1 and M2 is large, the output of the negative voltage drive circuit becomes saturated before the output of the negative voltage drive circuit is down to a desired voltage level. As a result, there is a problem in that the output of the negative voltage drive circuit is dependent on the capacitance of the load capacitor C2. Also, there is a disadvantage in that the output of the negative voltage drive circuit is dependent on the supply voltage Vcc since the coupling voltage is varied by the clock signal.

Therefore, it is an object of the present invention to provide a negative voltage drive circuit that can supply a highly negative voltage to a gate electrode of the flash EEPROM cell regardless of the capacitance of a load capacitor and the supply voltage.

SUMMARY OF THE INVENTION

To accomplish the above object, a negative voltage drive circuit according to the present invention comprises: switching element coupled between an input terminal and an output terminal wherein the input terminal is coupled to any one node of a charge pump; a cross latch pumping circuit for controlling the switching element according to a first clock signal and a second clock signal and for maintaining the lower output voltage than that of the charge pump; and a capacitor which performs pumping operation according to the first clock signal when the output terminal is isolated from the input terminal.

BRIEF DESCRIPTION OF THE INVENTION

For fuller understanding of the nature and objects of the invention, reference should be had to the following detailed description taken in conjunction with the accompanying drawings in which.

Similar reference characters refer to similar parts in the several views of the drawings.

DETAILED DESCRIPTION OF THE INVENTION

Figure 3:
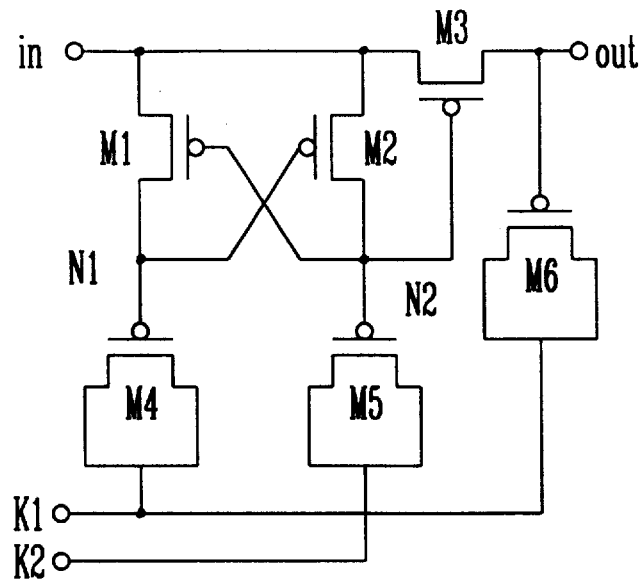
FIG. 3 illustrates a negative voltage drive circuit according to the first embodiment of the present invention.

FIG. 3 illustrates a negative voltage drive circuit according to the first embodiment of the present invention.

Referring to FIG. 3, a PMOS transistor M1 is coupled between an input terminal in and a node N1. A pumping capacitor M4 is coupled between the node N1 and a first clock input terminal K1. A PMOS transistor M2 is coupled between the input terminal in and a node N2. A pumping capacitor M5 is coupled between the node N2 and a second clock input terminal K2. A gate electrode of the PMOS transistor M1 is coupled to the node N2, while a gate electrode of the PMOS transistor M2 is coupled to the node N1. A PMOS transistor M3 is coupled between the input terminal in and an output terminal out, wherein a gate electrode of the PMOS transistor M3 is coupled to the node N2. A pumping capacitor M6 is coupled between the first clock input terminal K1 and the output terminal out. The pumping capacitors M4, M5 and M6 are each comprised of a PMOS transistor. The PMOS transistors M1 and M2, and the pumping capacitors M4 and M5 are operated as a cross latch pumping circuit. Especially, the PMOS transistors M1 and M2 are operated as a PMOS latch circuit.

Figure 6:
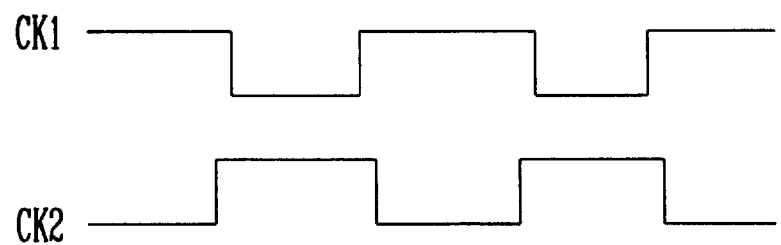
FIG. 6 are wave forms for explaining negative voltage drive circuit of FIGS. 2, 3, 4 and 5.

Electrical operation of FIG. 3 will be explained with reference to FIG. 6. A first clock signal CK1 is inputted to the first clock input terminal K1, while a second clock signal CK2 is inputted to the second clock input terminal K2. When the first clock signal CK1 becomes high level from low level and the second clock signal CK2 becomes low level from high level, the transistor M3 is turned on, whereby the input terminal in is coupled to the output terminal out. Accordingly, the output terminal out is discharged towards the input terminal in and the output voltage decreases because the phase difference between input and output is 180 degrees. The transistor M1 is also turned on, whereby the node N1 is discharged.

When the level of the first clock signal CK1 becomes low from high and the level of the second clock signal CK2 becomes high from low, the transistor M2 is turned on, whereby the potential of the input terminal in is equal to that of the output terminal out. While the transistor M3 is turned off and the output voltage of the output terminal out is instant aneously decreased by the pumping capacitor M6, whereby the output voltage of the output terminal out maintains the negative voltage during the first clock signal CK1 is at a low level. Especially the pumping capacitor M6 performs pumping operation when the output terminal is isolated from the input terminal.

Figure 1:
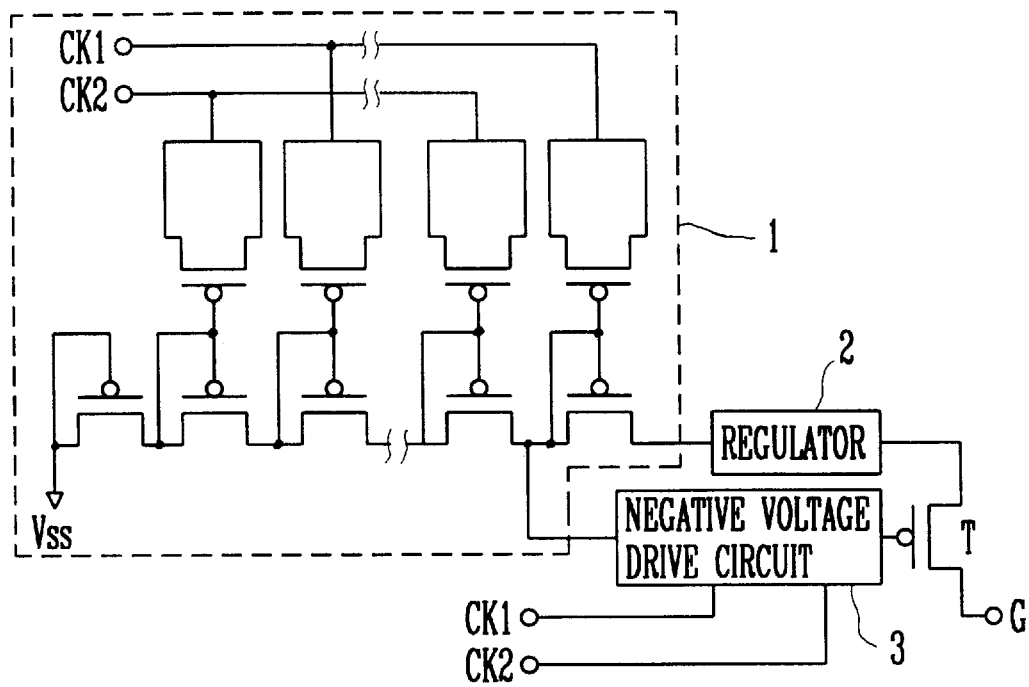
FIG. 1 is a block diagram for explaining a negative charge pump.
Figure 2:
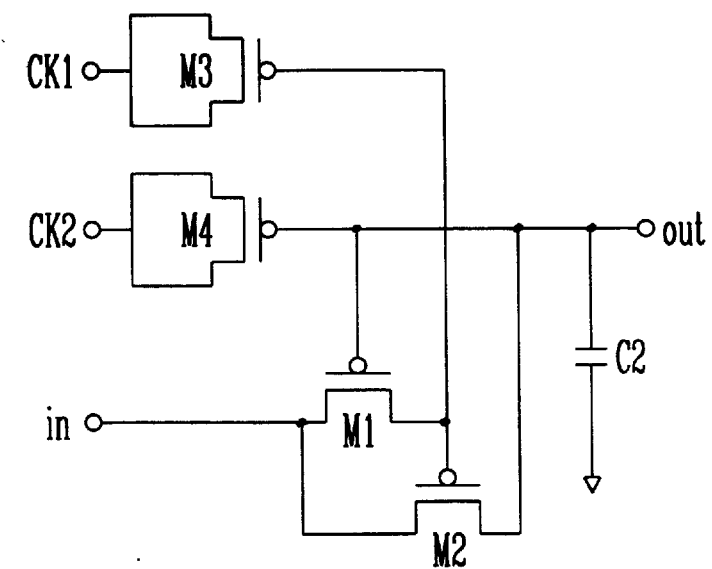
FIG. 2 illustrates a conventional negative voltage drive circuit.

The output voltage of the output terminal out maintains the lower voltage than that of the negative charge pump when the first clock signal is at a low level, thereby turning on the PMOS transistor T of FIG. 1. Therefore, the stable negative voltage can be applied to the gate electrode G of the flash EEPROM cell.

Figure 4:
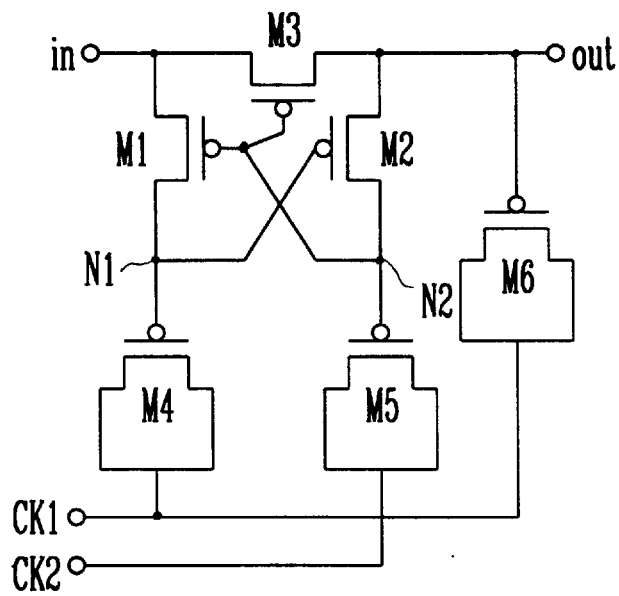
FIG. 4 illustrates a negative voltage drive circuit according to the second embodiment of the present invention.

FIG. 4 illustrates a negative voltage drive circuit according to a second embodiment of the present invention.

Referring to FIG. 4, a first and second clock signal CK1 and CK2 is applied to a first and second clock input terminal K1 and K2, respectively. When the level of the first clock signal CK1 becomes high from low while the level of the second clock signal CK2 becomes low from high, the transistors M1 and M3 are turned on, whereby the input terminal in is coupled to the output terminal out. Accordingly, the charge of the output terminal out is discharged toward the input terminal in and the output voltage decreases because the phase difference between input and output is 180 degrees. The transistor M1 is also turned on, whereby the node N1 is discharged.

When the first clock signal CK1 becomes low level from high level and the second clock signal CK2 becomes high level from low level, the transistor M2 is turned on, while the transistors M1 and M3 are turned off. Accordingly, the output voltage of the output terminal out is instantaneously decreased by pumping operation of the pumping capacitor M6, whereby the output terminal out maintains the negative voltage when the first clock signal CK1 is at a low level. By repeating such an operation, the output voltage of the output terminal maintains the lower voltage than that of the charge pump. Therefore, the stable negative voltage can be applied to the gate electrode G of the flash EEPROM cell.

Figure 5:
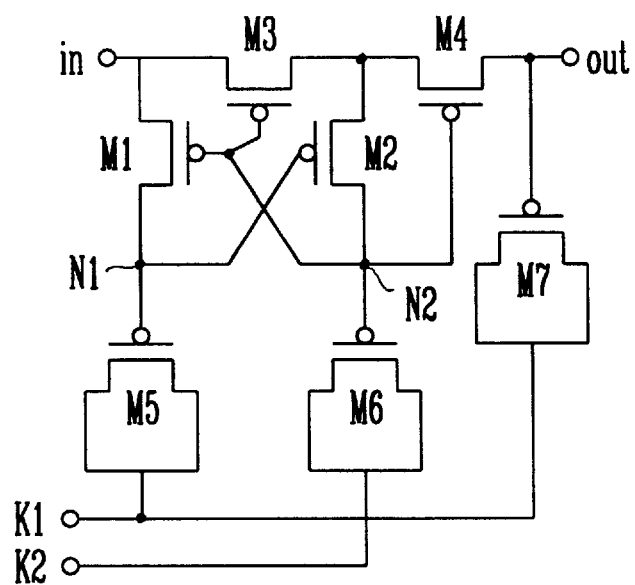
FIG. 5 illustrates a negative voltage drive circuit according to the third embodiment of the present invention.

FIG. 5 illustrates a negative voltage drive circuit according to a third embodiment of the present invention.

Referring to FIG. 5, a first and second clock signal CK1 and CK2 is applied to a first and second clock input terminal K1 and K2, respectively. When the level of the first clock signal CK1 becomes high from low while the level of the second clock signal CK2 becomes low from high, the transistors M1, M3 and M4 are turned on, whereby the input terminal in is coupled to the output terminal out. Accordingly, the output terminal out is discharged towards the input terminal in and the output voltage decreases because the phase difference between input and output is 180 degrees. The transistors M1 and M3 are also turned on, whereby the node N1 is discharged.

When the level of the first clock signal CK1 becomes low from high and the level of the second clock signal CK2 becomes high from low, the transistor M2 is turned on, while the transistors M1, M3 and M4 are turned off. Accordingly, the output voltage of the output terminal out is instantaneously decreased by pumping operation of the pumping capacitor M7, whereby the output terminal out maintains the negative voltage when the first clock signal CK1 is at a low level. By repeating such an operation, the output voltage of the output terminal maintains a lower voltage than that of the charge pump. Therefore, the stable negative voltage can be applied to the gate electrode G of the flash EEPROM cell.

Figure 7:
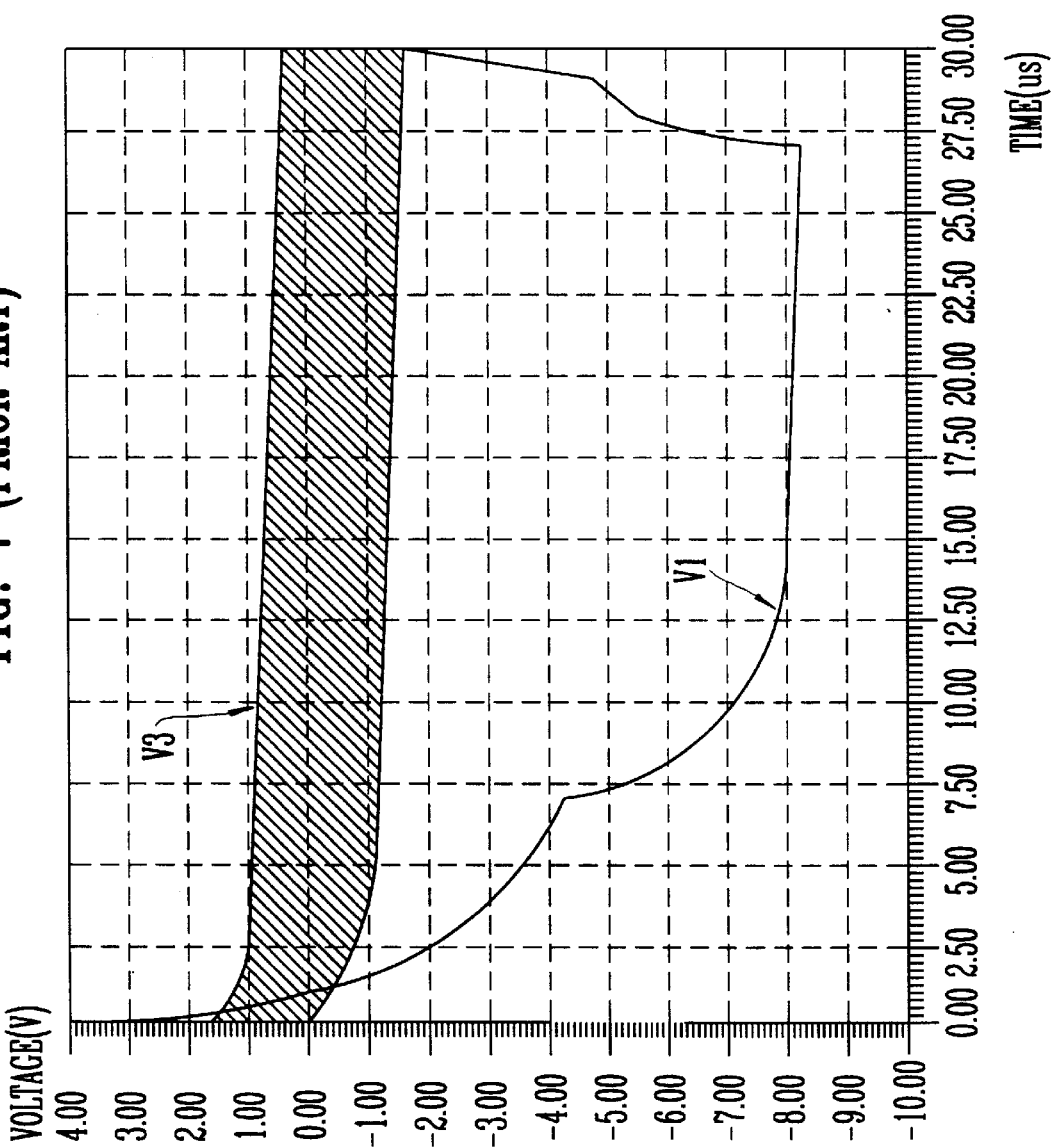
FIG. 7 are wave forms for explaining a conventional negative voltage drive circuit.

FIG. 7 illustrates wave forms for explaining a conventional negative voltage drive circuit. As shown in FIG. 7, since the negative voltage V1 which is output at the regulator 2 of FIG. 1 is −8 volt while the output voltage V3 of the negative voltage drive circuit is saturated at about −1 volt, the negative voltage V1 can not be steadily supplied to a gate electrode of the flash EEPROM cell.

Figure 8A:
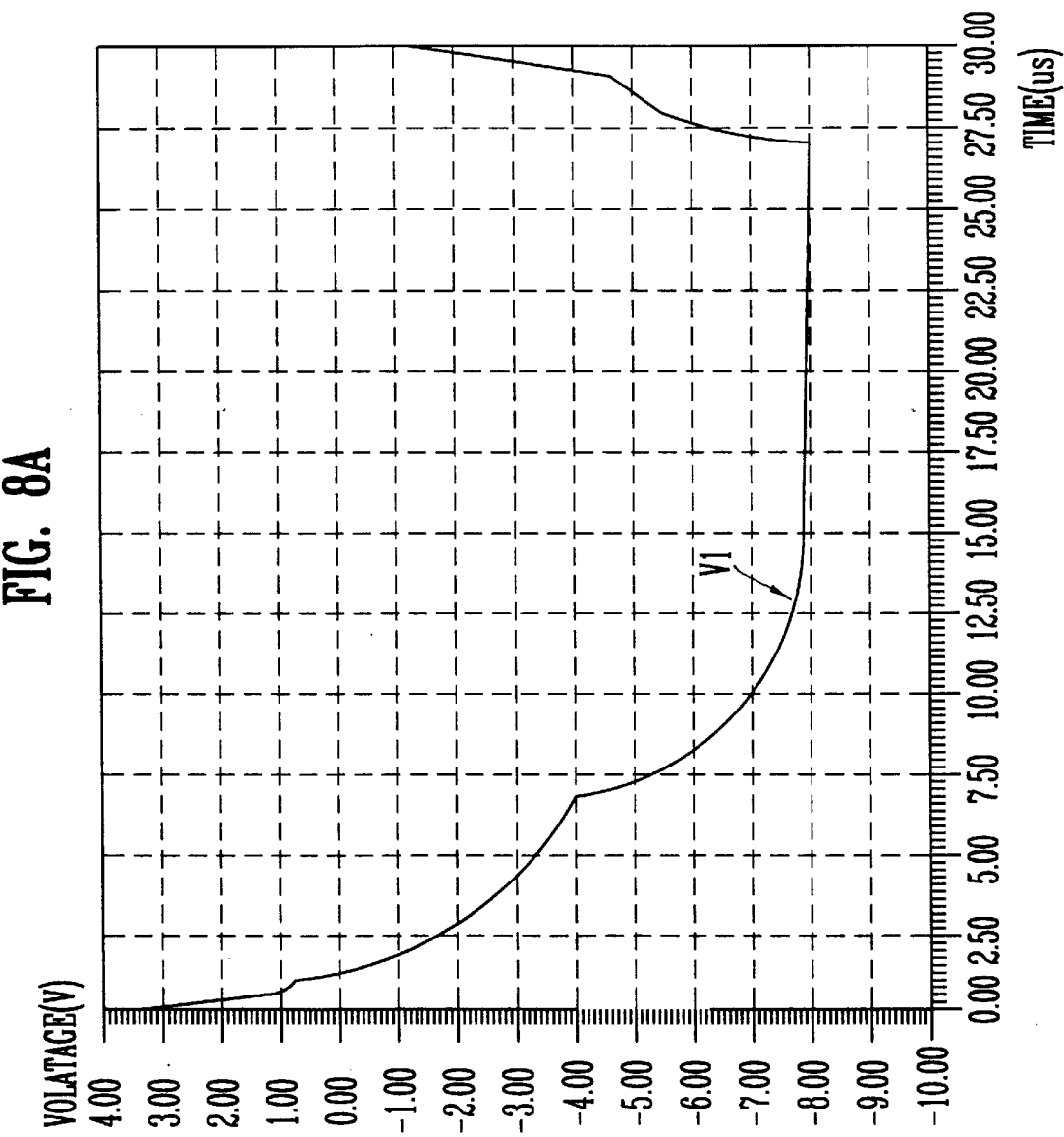
FIG. 8A is a wave form illustrating an output of a regulator of FIG. 1.
Figure 8B:
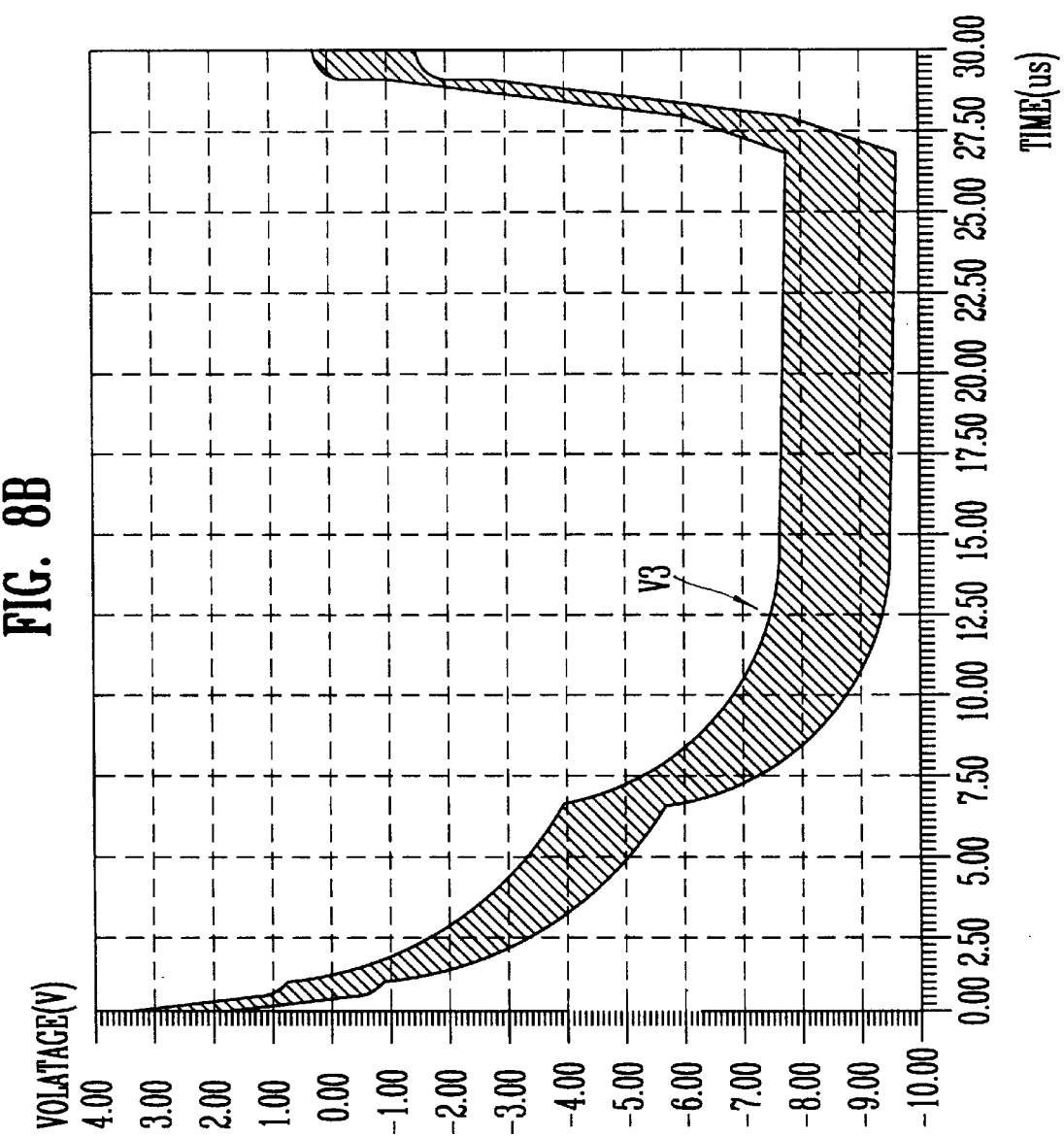
FIG. 8B is a wave form illustrating an output of a negative voltage drive circuit according to the present invention.

FIG. 8A illustrates the negative voltage V1 passing through a regulator 2, and FIG. 8B illustrates the output voltage of a negative voltage drive circuit according to the present invention. As shown in FIGS. 8A and 8B, since the output voltage of the negative voltage drive circuit is lower than that of the negative voltage passing through the regulator, the negative voltage V1 can be steadily supplied to the gate electrode of the flash EEPROM cell.

As described above, according to the present invention, a larger negative voltage can be supplied to the gate electrode of the flash EEPROM.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and spirit of the present invention are to be encompassed as further embodiments of the present invention.

What is claimed is:

1. A negative voltage drive circuit comprising:

switching element coupled between an input terminal adapted for coupling to a charge pump and an output terminal;

a cross latch pumping circuit for controlling said switching element according to a first clock signal and a second clock signal and for maintaining an output voltage of said negative voltage drive circuit to be lower than an output voltage of said charge pump; and a capacitor for performing pumping operation according to said first clock signal when the output terminal is isolated from the input terminal, said capacitor being formed from a PMOS transistor.

2. The circuit of claim 1, wherein said switching means is a PMOS transistor.

3. The circuit of claim 1, wherein said cross latch pumping circuit comprises:

first and second pumping capacitors to which said first and second clock signals are input, respectively; and a PMOS latch circuit operated according to said first and second clock signals passing through said first and second pumping capacitors.

4. A negative voltage drive circuit comprising:

a transistor having a gate electrode, a source electrode and drain electrode, wherein said source and drain electrodes are respectively coupled to an output terminal and an input terminal, said input terminal for being coupled to a charge pump;

a cross latch pumping circuit for controlling said transistor according to a first clock signal and a second clock signal and for maintaining an output voltage of said negative voltage drive circuit to be lower than an output voltage of said charge pump wherein phase difference between said first and second clock signal is 180 degrees; and a capacitor for performing pumping operation according to said first clock signal when said output terminal is isolated from said input terminal, said capacitor being formed from a PMOS transistor.

5. The circuit of claim 4, wherein said transistor is a PMOS transistor.

6. The circuit of claim 4, wherein said cross latch pumping circuit comprises:

first and second pumping capacitors to which said first and second clock signals are input, respectively; and a PMOS latch circuit operated according to said first and second clock signals passing through said first and second pumping capacitors.

7. The negative voltage drive circuit comprising:

a first transistor coupled between an output terminal and an input terminal for coupling to a charge pump;

a second transistor coupled between said input terminal and a first node, wherein a gate electrode of said second transistor is coupled to a gate electrode of said first transistor;

a third transistor coupled between said input terminal and a second node, wherein a gate electrode of said third transistor is coupled to said first node;

a first pumping capacitor coupled between a first clock input terminal receiving a first clock signal and said first node;

a second pumping capacitor coupled between a second clock input terminal receiving a second clock signal and said second node; and a third pumping capacitor coupled between said output terminal and said first clock input terminal.

8. The circuit of claim 7, wherein said first, second and third pumping capacitors are each comprised of a PMOS transistor.

9. The negative voltage drive circuit comprising:

a first transistor coupled between a first node and an input terminal for coupling to a charge pump;

a second transistor coupled between said input terminal and a second node, wherein a gate electrode of said second transistor is coupled to a gate electrode of said first transistor and a third node, respectively;

a third transistor coupled between said first node and said third node, wherein a gate electrode of said third transistor is coupled to said second node;

a first pumping capacitor coupled between a first clock input terminal receiving a first clock signal and said second node;

a second pumping capacitor coupled between a second clock input terminal receiving a second clock signal and said third node;

a third pumping capacitor coupled between an output terminal and said first clock input terminal; and a fourth transistor coupled between said first node and said output terminal, wherein a gate electrode of said fourth transistor is coupled to said third node.

10. The circuit of claim 9, wherein said first, second and third capacitors are each comprised of a PMOS transistor.

* * * * *